June 30, 1959　　　　　　J. E. COLLINS　　　　　2,892,608
VALVE

Filed Jan. 25, 1956　　　　　　　　　　　　2 Sheets-Sheet 1

INVENTOR.
John E. Collins
BY
Bates, Peare & McBean
ATTORNEYS

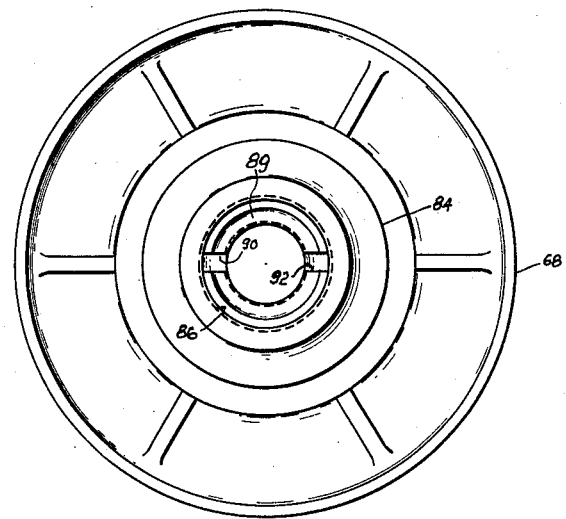
Fig. 2
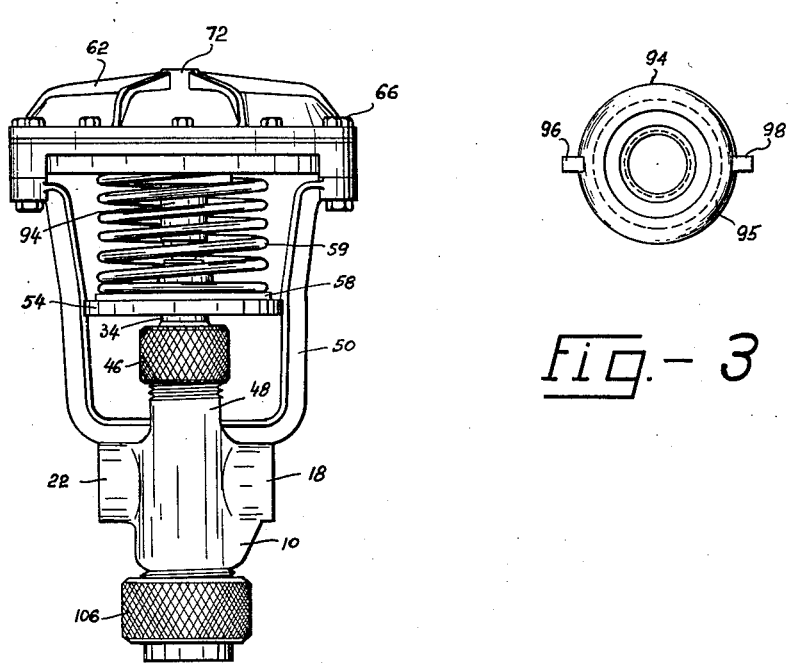
Fig.-3
Fig.-4
INVENTOR.
JOHN E. COLLINS
BY
Bates, Teare & McBean
ATTORNEYS

United States Patent Office 2,892,608
Patented June 30, 1959

2,892,608

VALVE

John E. Collins, Akron, Ohio, assignor, by mesne assignments, to International Basic Economy Corporation, New York, N.Y., a corporation of New York Application January 25, 1956, Serial No. 561,278

3 Claims. (Cl. 251—61)

This invention relates to valves and more particularly to valves which are used for controlling the flow of fluids in gaseous or liquid systems.

The present invention relates especially to the type of flow control valves having a fluid motor operator mounted on the outside of the valve housing for reciprocating the valve stem. In such valves, the valve stem normally projects through a packing member of the housing and then concentrically through a surrounding helical spring to the so-called "piston" or fluid-responsive member of the motor operator of the valve which is biased away from the valve housing by the spring. The present invention provides a novel connection between the motor piston and the valve stem in the region near the packing in the valve housing. This connection embodies self-aligning ball joints both at the junction with the valve stem near the packing and also at the piston, and it provides for easy manual removal of the piston member without the necessity for prying apart or having otherwise to deflect forcibly the stiff coils of the biasing spring.

In the drawings:

Fig. 2 is a bottom plan view of the piston which actuates the valve stem.

Fig. 3 is a top plan view of the piston swivel adaptor which connects the piston and the valve stem extension.

Fig. 4 is a front elevational view of the valve shown in Fig. 1.

Figure 1:
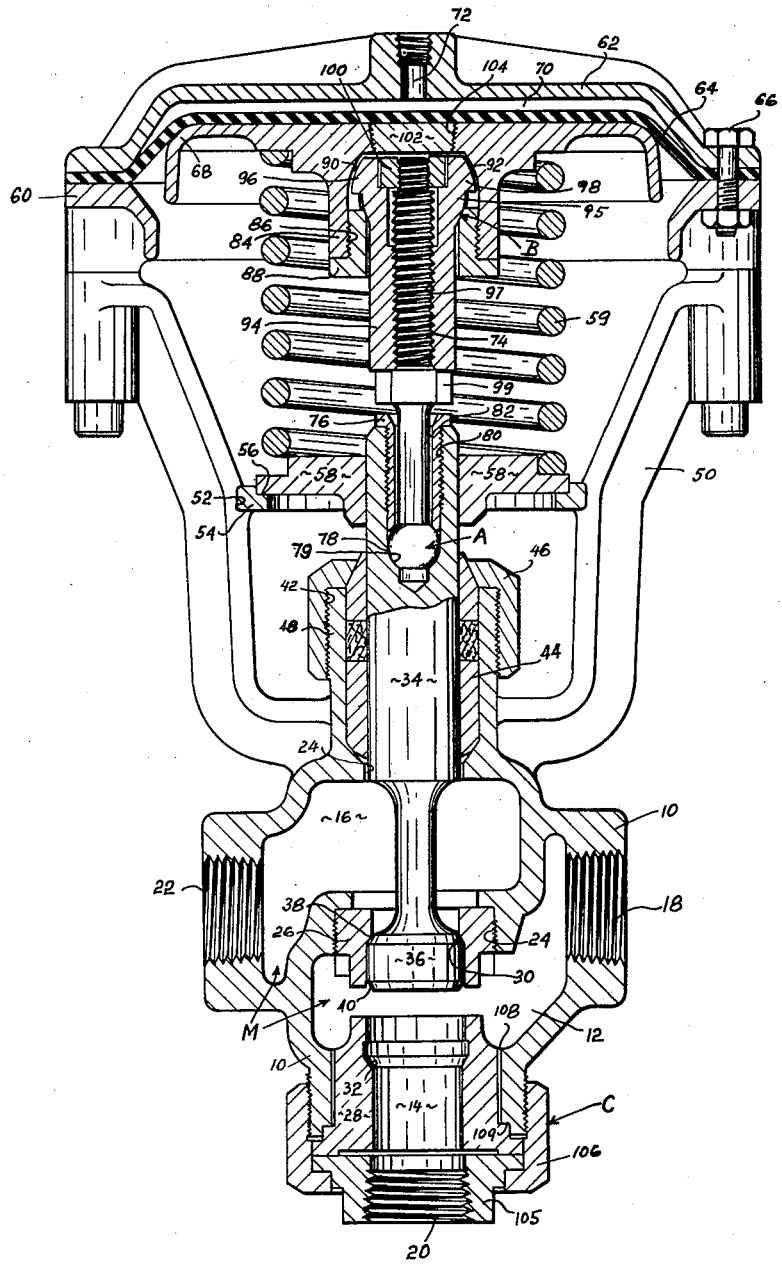
Fig. 1 is a vertical sectional view through a valve embodying the present invention.

The valve illustrated is one which is adapted for use in controlling the flow of fluid under pressure from a source of supply to one or more outlet conduits under the control of a fluid pressure actuator, the latter of which is remotely controlled by an operator. Although the valve in the present instance takes the form of a plunger type three-way fluid valve having three ports, the valve may be a two-way, four-way or any other type of plunger operated fluid valve.

Referring to the drawings there is shown a valve having a body or housing 10, including a manifold M comprising an inlet passageway 12 and outlet passageways 14 and 16, having at their outer ends inlet port 18 and outlet ports 20 and 22 respectively. The housing 10 has a bore 24 which extends through the body and is in communication with the passageways 12, 14 and 16.

A two piece sleeve is shown as being disposed in the lower portion of the bore 24 and comprises an upper sleeve member 26, which is threaded into the bore and the lower sleeve member 28, which is telescoped into the bore. Each of the sleeve members 26 and 28 has a beveled shoulder forming the oppositely facing seats 30 and 32 respectively.

The flow of fluid through the valve is controlled by a valve main stem or plunger 34, which is slideably positioned within the upper portion of the bore 24 and within the upper sleeve member 26. Disposed at the lower end of the stem 34 is a head 36 having two oppositely disposed seats 38 and 40 thereon. The seats 38 and 40 are adapted to alternately engage the seats 30 and 32 respectively, in accordance with the selected position of the stem 34 within the bore 24. In the position illustrated (Fig. 1), the stem seat 38 is in engagement with the sleeve seat 30, at which time fluid may flow from inlet port 18 through inlet passageway 12, through the outlet passageway 14 (in the lower sleeve member 28) and out the outlet port 20. When the stem seat 40 is in engagement with the lower sleeve seat 32, fluid may flow from inlet port 18, through the inlet passageway 12, through the upper sleeve 26, through outlet passageway 16 and out the outlet port 22.

The upper portion of the body 10 houses the plunger actuating parts and includes the upper portion 42 of the bore 24 which is of an enlarged diameter. The bore portion 42 is adapted to receive a packing ring assembly 44 or the like, which is secured in position by an annular collar 46, the latter of which is threaded onto an annular sleeved extension 48 of the body 10. This packing construction serves to seal the flow of fluid upwardly in the housing from the manifold M and additionally serves as a guide for the stem 34.

A yoke 50 is formed integral with the upper portion of the valve body 10 and contains the upper portion of the valve assembly, which will now be described. Disposed approximately half way up the yoke and on the inside thereof is an annular groove 52, which is adapted to receive a ring 54 or the like. The ring 54 has a shoulder 56 on which is disposed the sleeved washer 58, which serves as an additional guide for the stem 34, and also serves as the bottom support for a stem spring 59. The yoke supports a top ring 60 and a top cover or cap 62. A diaphragm 64 may be clamped between the top ring 60 and the cover 62 by bolts 66, and may bear against the top face of the piston 68, thereby providing a chamber 70 for receiving pressurized fluid through the chamber inlet port 72. The upper portion of the inlet port 72 is threaded to receive a conduit for connection to a source of pressurized fluid, which may be under remote control by an operator in the customary manner.

The stem 34 has a connecting member or extension 74, which extends into the upper part of the valve structure and is connected to the stem by a ball pivot connection A. To assemble the connection A, the retainer sleeve nut 76 is telescoped onto the lower portion of the stem extension 74 as shown, after which the spherical ball or ball pivot 78 is welded or otherwise suitably secured to the stem extension. This assembly is then attached to the main stem or plunger 34, as by threading the retainer sleeve nut 76 into the threaded bore 80 in the upper portion of the main stem member. The ball pivot 78 is spherically contoured for a ball-socket type of engagement with the spherical socket portion 79 of the lower end of the stem bore 80. A slight clearance is provided between the ball 78 and the lower portion of bore 80 to permit the ball to pivot freely in the bottom of the bore. A clearance 82 is provided between the stem extension 74 and the retainer sleeve nut 76 to allow a limited amount of tilting of the stem extension with respect to the main stem 34.

The valve stem extension 74 is adjustably connected at its upper end to the piston 68 by means of a second ball pivot connection B, now to be described. The piston 68 has a hub 84 having a bore 86, the lower portion of which is threaded to receive the retainer nut 88. The upper portion of the bore 86 curves inwardly to form a socket portion 89 (Fig. 2), which has the oppositely disposed slots or grooves 90 and 92 (Figs. 1 and 2) therein. Disposed on the stem extension 74 is a piston swivel adaptor 94, having at its upper end a frusto spherical head 95, which has the oppositely disposed ribs 96 and 98 (Figs. 1 and 3) formed integral therewith. The ribs 96 and 98 are adapted to fit into the slots 90 and 92 in the piston hub portion and the head 95 is contoured for a ball socket type of engagement with the complentary frusto-spherical surface on the interior of socket 89. This rib-slot construction forms an interlock which prevents the piston from turning with respect to the swivel adaptor.

To assemble the connection B, the swivel adaptor 94 is placed head first into the socket 89, so that the ribs 96 and 98 are inserted into the slots 90 and 92 respectively. The retainer nut 88 is then threaded into the bore 86 of the piston to hold the swivel adaptor in operative engagement with the piston. A slight clearance is provided between the head 95 and the socket 89 to permit the adaptor to pivot freely in the socket. The assembly thus far completed is than placed in the valve with the swivel adaptor being telescoped onto the stem extension 74 until it engages the stem collar 99. This assembly is then secured to the stem extension by the lock nut 100, which is threaded onto the top of the extension as shown (Fig. 1). A plug 102 is then threaded into the bore 104 flush with the top of the piston to complete the assembly of the ball-pivot connection B.

The operation of the valve will now be described. The stem spring 59, which is interposed between the washer 58 and the piston 68, serves to retain the piston in tight engagement with the flexible diaphragm 64 as shown (Fig. 1). To actuate the valve, pressurized fluid is admitted through the inlet port 72 to the chamber 70, thus forcing the piston downward, (against the force of spring 59). The piston forces the stem downward until the stem seat 40 engages the seat 32. This permits pressurized fluid to flow from port 18 through the valve and out the port 22 as previously described. When the pressurized fluid is allowed to discharge from the chamber 70, the stem is returned to its upper position (Fig. 1) by the spring 59 until the stem seat 38 engages the seat 30, thus permitting pressurized fluid to flow from port 18, through the valve and out the port 20 as afore-described. This cyclic procedure may be repeated as often as desired. Reciprocation of the plunger is thus responsive to the admittance and discharge of pressurized fluid to and from the chamber 70.

Another feature of the invention is the dual ball pivot assembly on the stem extension 74 above described, which provides a full swivel action to the piston, the stem and the stem extension. Misalignment of the stem or its extension (or associated parts) or an uneven application of the pressurized fluid on the diaphragm or the like, may cause side pressures to be applied to the stem and cause it to bind in the valve housing. The present structure tends to prevent the stem or its extension from binding in the housing by reducing side pressures imparted to the stem to a minimum. It will be noted that the lower ball pivot 78 is located deep in the stem 34 so that any side thrust imparted thereto is taken by the ball pivot joint itself.

Another feature of the invention is the novel sleeve and plug assembly C (Fig. 1) at the bottom of the valve housing. The assembly C comprises the sleeve member 28, which is telescoped into the lower portion of the bore 24, the plug 105 disposed beneath the sleeve member 28, and the retainer ring 106, which is threaded onto the housing 10, and which retains the member 28 and the plug 105 in position. One of the difficulties experienced in structures of this type, is the inadvertent seepage of fluid (from the manifold M) down through the joint between the sleeve 28 and the housing 10 and into the threaded joint between the sleeve retainer ring 106 and the housing 10. Chemical impurities in the pressurized fluid solidify in these joints rendering it difficult, if not impossible, to dismantle the assembly C. To avert this problem, a clearance 108 is provided in the vertical portion of the joint between the sleeve 28 and the housing 10. The clearance 108 is of sufficient width to prevent the solidified chemicals from closing the gap thus formed between the sleeve and the housing. In addition, a lapped joint 109 is provided at the horizontal juncture of the sleeve 28 and the housing 10, which prevents the entry of pressurized fluid into the threaded joint between the retainer ring 106 and the housing 10 and the joint between the retainer ring and the plug 105.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

I claim:

1. In a valve mechanism including a valve stem end projecting outside a valve housing through a packing therein, and a fluid-actuated motor operator engaged with said housing, the motor having a piston and a helical spring concentric with the valve stem for biasing said piston away from said valve stem end, the improvement comprising a rod member extending lengthwise through said spring between said piston and said stem end, said rod member having one end connected to said stem end adjacent said packing, and said rod member having its opposite end in threaded engagement with an adapter disposed generally axially of the valve stem and within said spring, said adapter having a head portion with a frusto-spherical surface thereon, a complementary frusto-spherical surface on said piston engaged with said adapter surface, means maintaining said surfaces in engagement to provide a loose self-aligning connection between the adapter and piston, and other means loosely interconnecting said adapter and said piston to restrict universal movement thereof to the extent that relative rotation between the piston and adapter is precluded.

2. In a valve mechanism according to claim 1, a ball-socket connection between the end of said rod member opposite adapter and the end of said valve stem outside said packing of the housing, said connection cooperating with said self-aligning piston-and-adapter connection to minimize binding of the valve stem against the packing during reciprocation thereof.

3. In a valve mechanism which includes a valve housing having a valve stem with one end outside the housing, the stem being reciprocative through a packing seal in said housing for operating flow control means in said housing, and a fluid-pressure actuated motor operator for reciprocating the valve stem including a yoke rigidly engaged with the housing, a stationary motor member fastened to said yoke, a movable member including a piston associated with the stationary member and movable relative thereto in response to fluid pressure, and a helical coil valve spring concentric with said stem and biasing said piston away from said valve housing, the improvement comprising a rod member extending lengthwise through said spring between said piston and said stem end, said rod member having one end thereof seated loosely within said outside stem end and having a universal ball-socket connection with said stem end in a region adjacent said packing seal, and said rod member having its opposite end in threaded engagement with a tubular adapter along a substantial length of said rod member within said spring, the adapter having a head portion with a frusto-spherical surface engaged with a complementary frusto-spherical surface on said piston to provide a loose self-aligning connection between said adapter and said piston, and means loosely interconnecting said head portion and said piston to restrict universal movement thereof to the extent that relative rotation between the piston and adapter is precluded.

(References on following page)

References Cited in the file of this patent

UNITED STATES PATENTS

| | | |
|---|---|---|
| 627,103 | Curtis | June 20, 1899 |
| 1,729,849 | Willgoos | Oct. 1, 1929 |
| 1,937,246 | Reedy | Nov. 28, 1933 |
| 2,328,902 | Grove | Sept. 7, 1943 |
| 2,606,051 | Thorn | Aug. 5, 1952 |
| 2,636,757 | Bakane | Apr. 28, 1953 |
| 2,647,380 | Throeger et al. | Aug. 4, 1953 |